United States Patent [19]
Barker

[11] 3,753,736
[45] Aug. 21, 1973

[54] METHOD OF PACKING ASPARAGUS FOR THE GROWING FIELD

[76] Inventor: George R. Barker, Banning, Calif.

[22] Filed: Aug. 24, 1970

[21] Appl. No.: 66,238

Related U.S. Application Data

[62] Division of Ser. No. 770,722, Oct. 25, 1968, Pat. No. 3,548,577.

[52] U.S. Cl. ............................ 99/100 R, 99/233.12
[51] Int. Cl. ............................................. A23l 1/00
[58] Field of Search ................... 99/171 R, 186, 17, 99/100 R, 103; 53/123 R; 56/327 A; 146/81 R, 81 A

[56] References Cited
UNITED STATES PATENTS

| | | | |
|---|---|---|---|
| 1,333,858 | 3/1920 | Low et al. | 146/81 A |
| 1,579,598 | 4/1926 | De Back | 146/81 A |
| 1,785,795 | 12/1930 | Stoppel | 146/81 A |
| 1,872,889 | 8/1932 | Champlin et al. | 146/81 A |
| 2,791,878 | 5/1957 | Kepner | 56/327 A |
| 3,353,577 | 11/1967 | Bruel et al. | 146/81 R |

Primary Examiner—Norman Yudkoff
Assistant Examiner—Kenneth P. Van Wyck
Attorney—Lyon and Lyon

[57] ABSTRACT

A method of harvesting asparagus utilizing an asparagus harvester which engages the growing asparagus in the field, saws the asparagus below the ground, releases the asparagus butt first onto a grooved belt, then conveys the asparagus up an incline where the asparagus is conveyed butt first onto a second grooved conveyor belt and against a stop member; this conveyor belt travels perpendicular to the first belt. After the asparagus comes to a stop, the butt portions which were growing underground are sawed off by a second saw, and the remainder of the spears are allowed to travel along this belt until they reach a sorting member at which they are sorted into two predetermined lengths; the short spears are passed directly from this member into one box. The longer spears are oriented tip first and are carried up a conveyor belt to another grooved conveyor running perpendicular and horizontal to the last conveyor. Here the longer spears are sawed to a predetermined maximum tip length and routed to a container. The remaining cut made here are "center cuts," which are likewise routed to a container.

1 Claim, 11 Drawing Figures

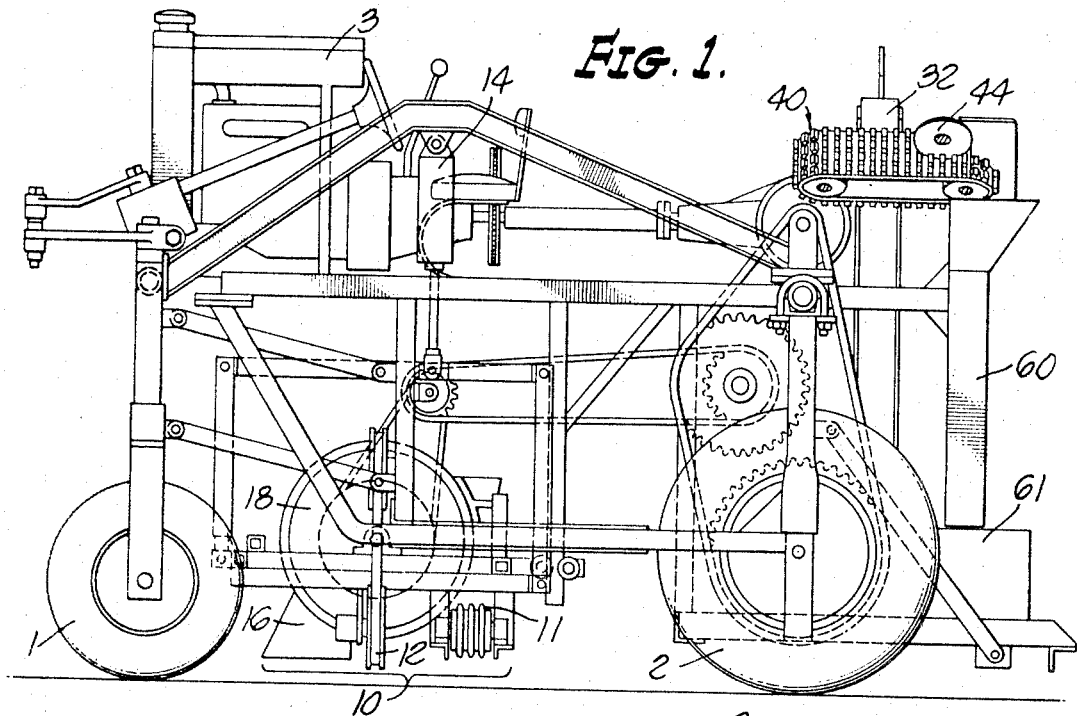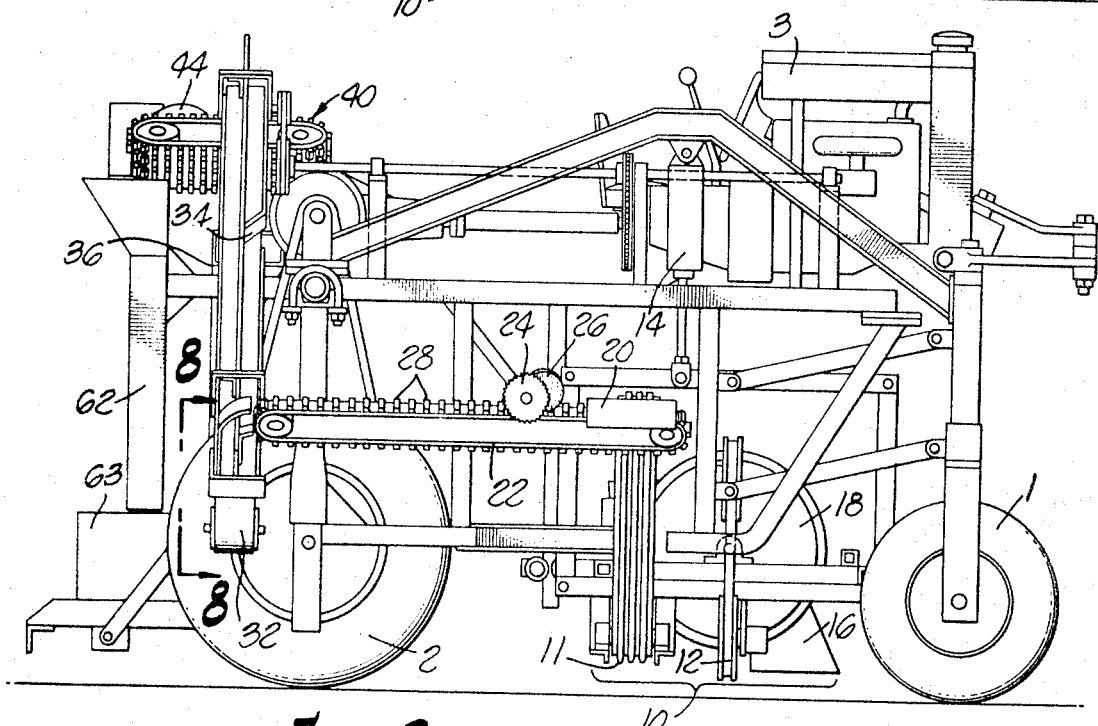

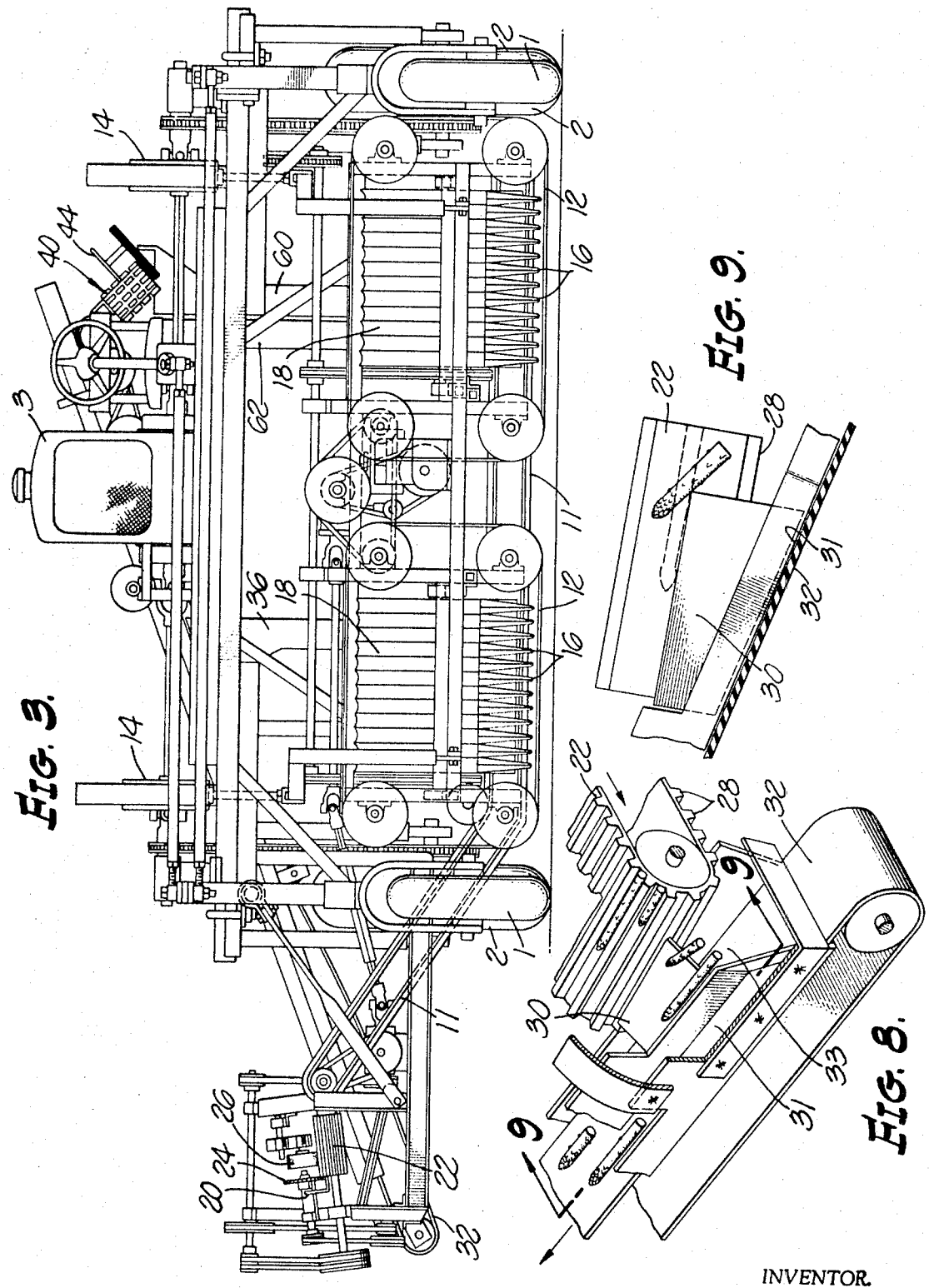

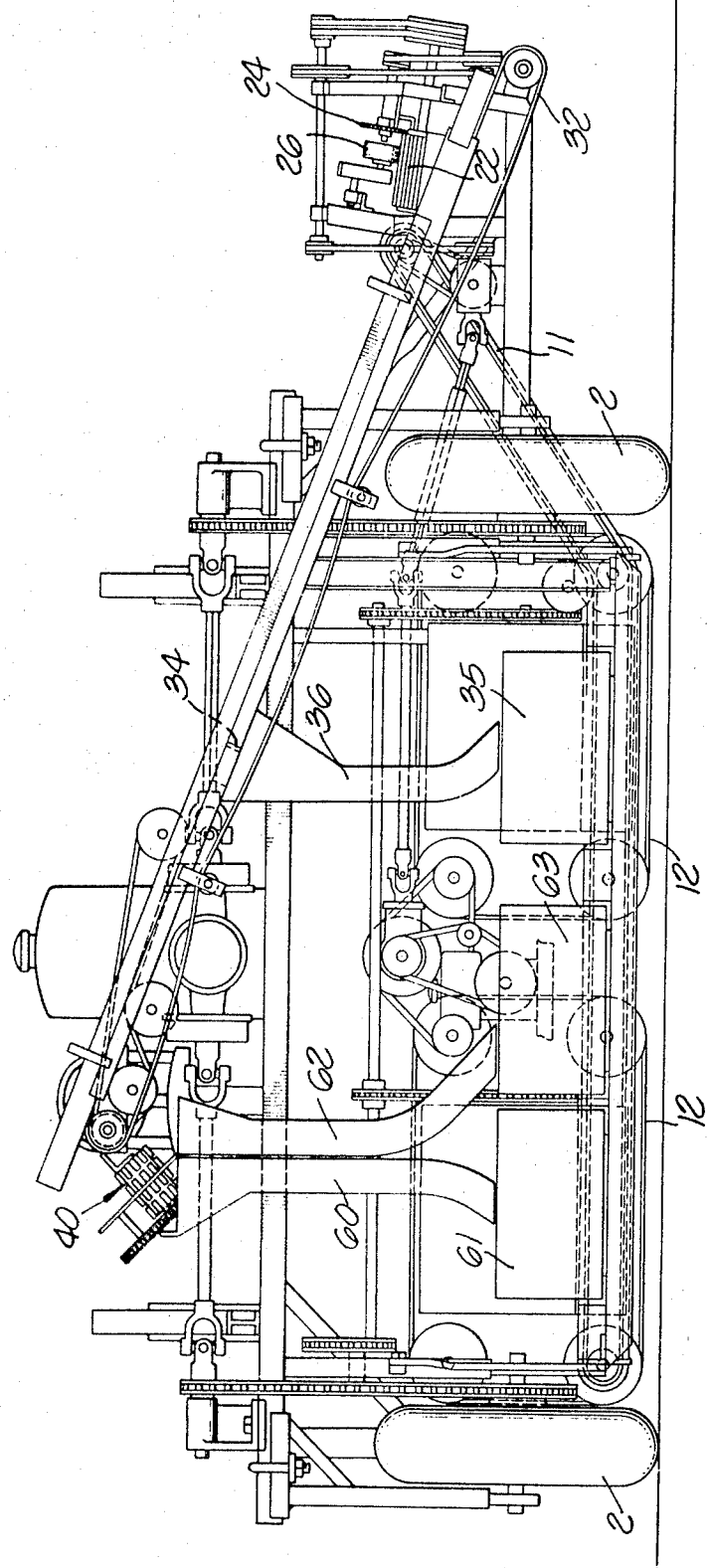

INVENTOR
GEORGE BARKER
BY
Lyon & Lyon
ATTORNEYS

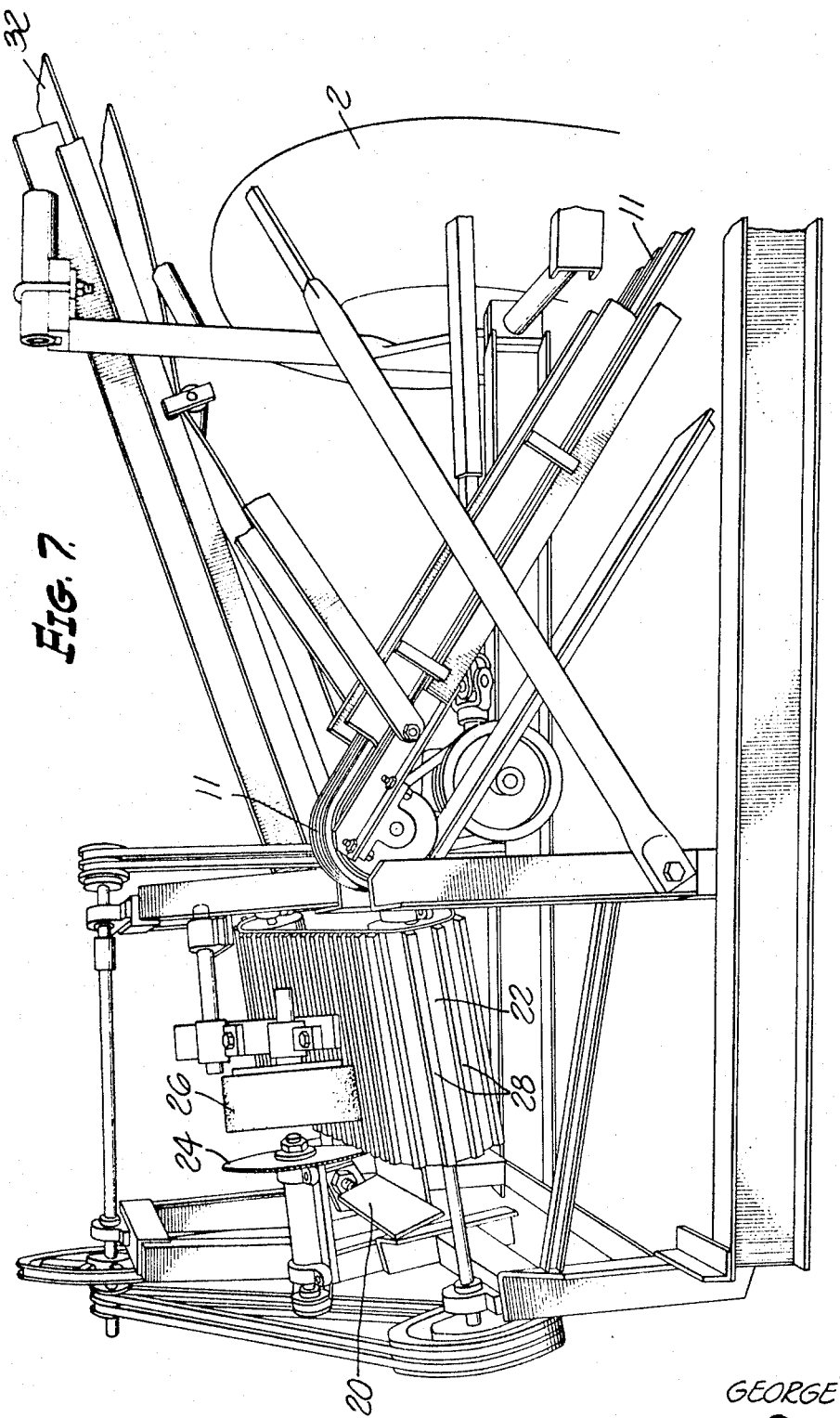

INVENTOR.
GEORGE BARKER
BY
Lyon Lyon
ATTORNEYS

METHOD OF PACKING ASPARAGUS FOR THE GROWING FIELD

The present invention is directed to the method of harvesting and assorting asparagus and is a division of my co-pending application Ser. No. 770,722 filed Oct. 25, 1968 and now U.S. Pat. No. 3,548,577 for "Asparagus Harvester" and is directed to the mode of operation of that apparatus.

BACKGROUND OF THE INVENTION

Previously asparagus was cut by hand and boxed in the field by laborers cutting the spears from the underlying plants with a knife every day or two during the several months growing period. This practice left the grower subject to various problems in obtaining labor to do this hand picking, trimming and sorting. After the asparagus was cut and field processed it was then shipped to the canners or other processors who then had to further trim the asparagus and cut it to the required tip lengths and then washed it and the orientation of the spears was done usually by hand.

The present invention provides a method whereby a processor may order certain desired asparagus tips and center cut portions directly from the grower and receive already cut and trimmed tips, ready for washing and processing.

One of the principle objects of the present invention is the elimination of a large number of personnel who are required to cut, pick, and sort the asparagus as it is grown in the field.

Another principle object of the present invention is to provide asparagus tips to the consumer which meets his length specifications without requiring any further cutting.

A still further object of the present invention is to provide a simple and inexpensive method of cutting growing asparagus, removing the unwanted butt end, sorting the asparagus, and cutting the tips to the desired length.

Another object of the present invention is to provide an apparatus which can be maintained and operated by a very few workers.

A still further object of the present invention is to reduce the cost of harvesting and preparing asparagus to consuming public.

A still further object and advantage of the present invention is that the trimming of the asparagus is done in the field and the trimmings become beneficial humus and need not be discarded later to become a pollutant.

These and other objects and advantages of the present invention will become apparant from the following specification when read with the accompanying drawings, in which:

DESCRIPTION OF THE DRAWINGS

FIG. 1 is a side elevation of the asparagus harvester illustrating the location of the last cutting saw.

FIG. 2 is a side elevation of the asparagus harvester illustrating the first cutting saw and the conveyor and sorting mechanisms between the two cutting saws.

FIG. 3 is an elevation of the front end of the asparagus harvester.

FIG. 4 is an elevation of the rear end of the asparagus harvester.

FIG. 7 is an isometric projection of the feed conveyor from the harvester pick-up to the butt-cutting saw.

FIG. 8 is a detail of the length-sorting assembly taken from lines 8—8 of FIG. 2.

FIG. 9 is an elevation taken from lines 9—9 of FIG. 8 and illustrates how the length and center of gravity determines the sorting of the asparagus.

DESCRIPTION OF THE INVENTION

Figure 5:
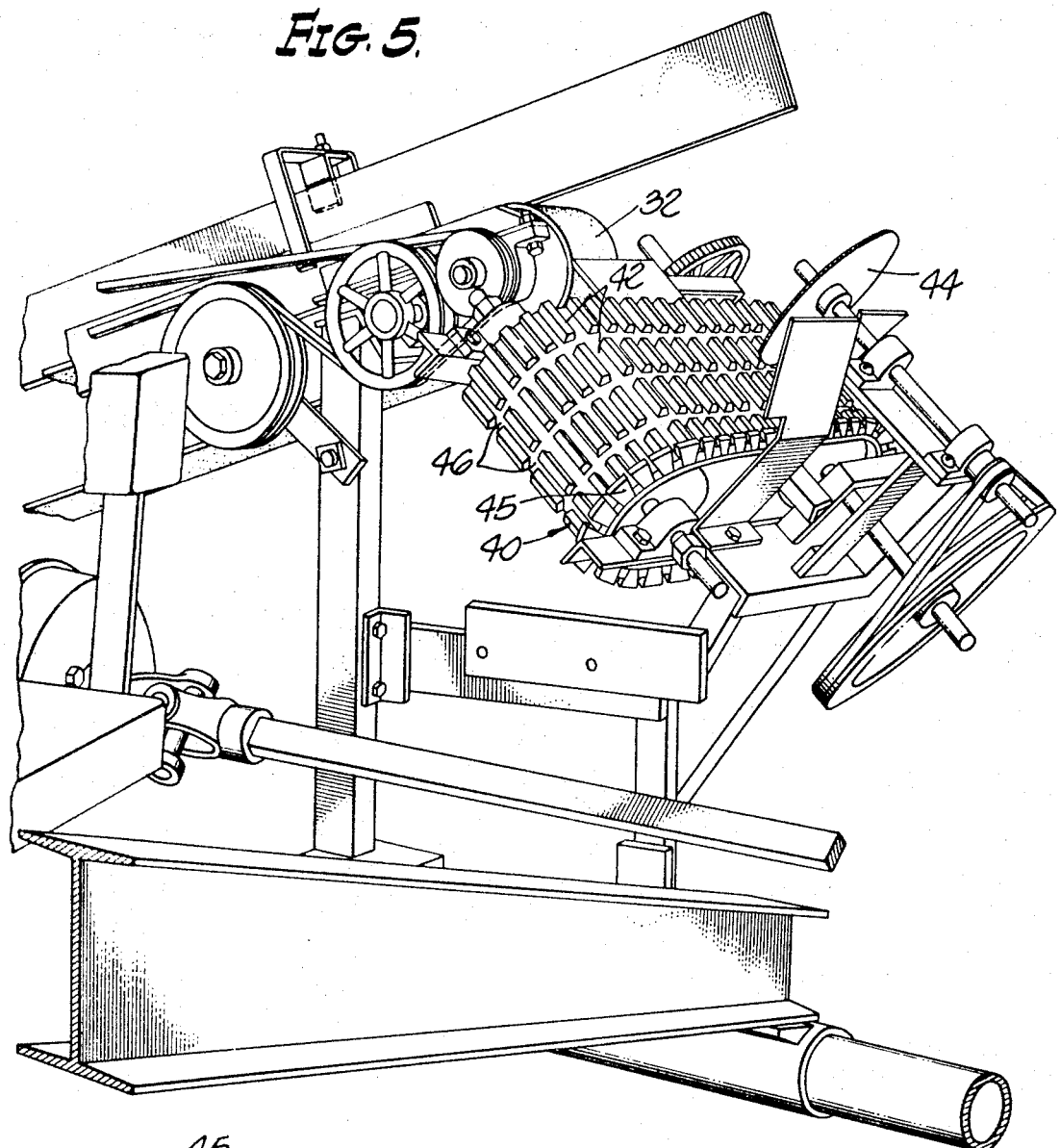
FIG. 5 is an isometric projection of the conveyors and saw utilized in cutting the asparagus tips to a specific length.
Figure 6:
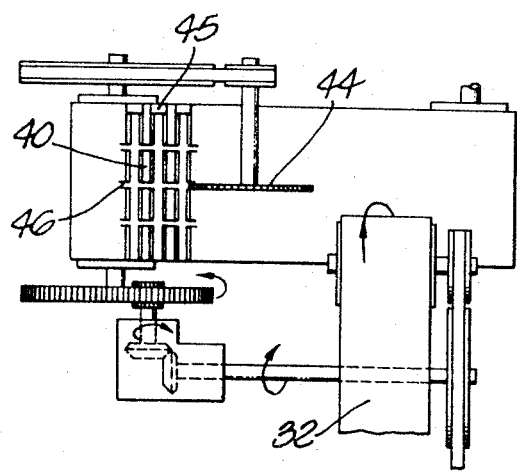
FIG. 6 is a top elevation of the device shown in FIG. 5 illustrating the movements of one conveyor to the other.
Figure 11:
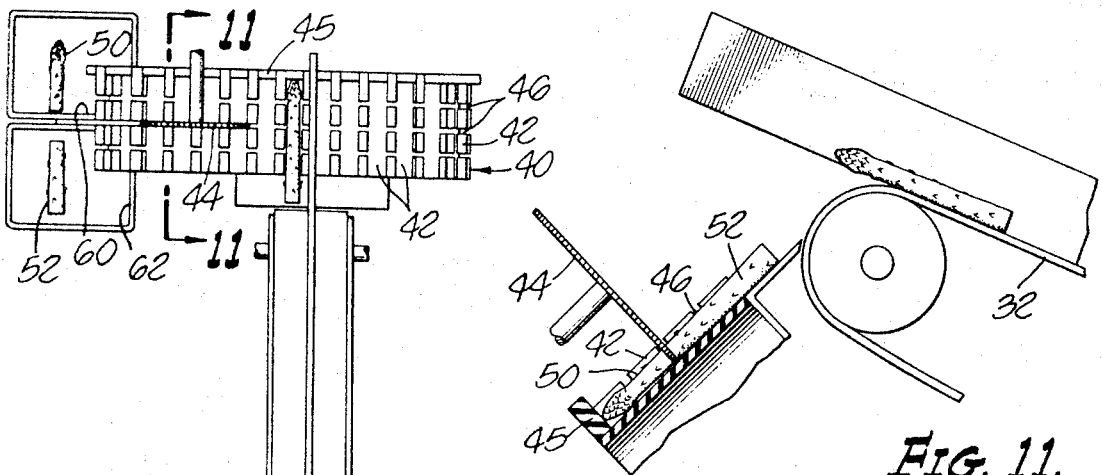
FIG. 11 is a sectional elevation of the conveyors and cutting saw taken along lines 11—11 of FIG. 10.

Referring now to FIG. 1 which illustrates the left side view of the overall asparagus harvester as viewed from the normal driving position, the harvester has a steerable front wheel 1 and rear wheels 2 which are driven by a tractor 3 and associated framework which is well known in the harvester manufacturing art.

The asparagus harvester 10 and associated pick-up conveyor 11 as described in U.S. Letters Pat. No. 2,791,878, issued to Robert A. Kepner on May 14, 1957, is located in a framed in the forward portion of the harvester and is adjusted downwardly so that the bandsaw 12 will be cutting below the ground by hydraulic cylinders 14. Once this operation has been performed, the deflector guides 16 divide the asparagus into rows to be picked up by the harvester drum 18. The bandsaw 12 then cuts the asparagus from the ground and harvester drum 18 places it butt first on conveyor 11 as described by Kepner U.S. Pat. No. 2,791,878. The conveyor 11 then travels upwards from the horizontal, carrying the asparagus at a speed sufficient to place the asparagus butt end first against a stop 20 adjacent conveyor 22 which is traveling perpendicular to conveyor 11 as is best illustrated by FIGS. 3 and 7. To the rear of the stop 20 is a saw 24 and a roller 26. The roller holds the asparagus stalks against the conveyor 22 as the saw 24 cuts off the butt ends of the asparagus which were initially underground. These butt ends are then discarded onto the field.

Conveyor 22 is arranged with ribs 28 in between which the asparagus stalks lie and facilitates their movement along the conveyor.

After these stalks have been cut by saw 24, they pass along the conveyor to the sorting mechanism, which is best illustrated by FIG. 8. At this point, the stalks are sorted as to their length. The long stalks strike the sorting plate 30 and as their center of gravity is further toward the center of the plate 30, they are allowed to pass into bin 31 and up the conveyor 32. The shorter stalks which are referred to as tips fall over the edge of plate 30 and pass into bin 33. These shorter stalks are routed along conveyor 32 and are channeled off of the conveyor by divider 34 into a box 35, as illustrated best by FIG. 10.

Figure 10:
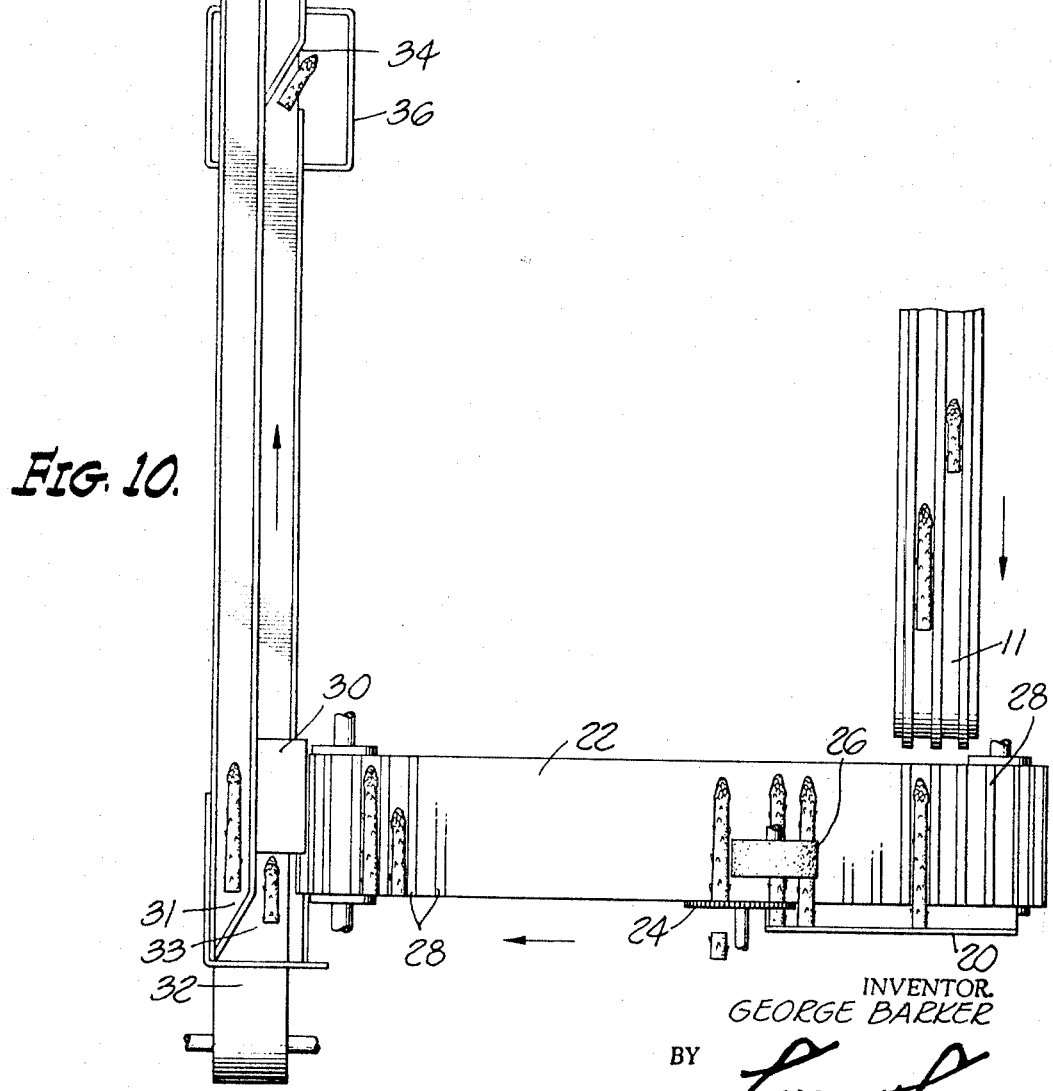
FIG. 10 is a schematic elevation indicating the various processes performed by thecutting and sorting mechanisms.

The longer stalks continue along conveyor 32 until they reach conveyor 40 and are deposited thereon. Conveyor 40, as illustrated in FIGS. 5 and 10, has segmented channels 42 on its surface. These segmented channels move the stalks perpendicular to the conveyor 32 and through saw 44, which cuts the longer stalks into spears of desired length. Saw 44 is adjustable away from stop 45 and may be placed in any of the sets of grooves 46 to provide the desired length of spear. This now leaves the operator with an asparagus spear 50 and a center cut portion 52. This spear 50 passes into a chute 60 and into a packing box 61. The center cut portions are routed by chute 62 either into packing box 63 or into oacking box 35 containing the short tips depending upon the type of pack that the operator desires.

Various changes and modifications may be made in carrying out the present invention without departing from the scope and spirit thereof. Insofar as these changes and modifications are within the purview of the annexed claims, they are to be considered as part of the invention.

I claim:

1. A method of packing asparagus growing in a field comprising the steps of cutting the asparagus below the level of the ground and concurrently in the growing field, dropping the cut asparagus onto a moving conveyor so that the butt ends of the asparagus strike the conveyor causing the stalks on the conveyer to be aligned with the butt ends thereof pointing in the direction of travel; directing the aligned asparagus stalks against positioning stop; cutting a portion from the butt ends of the asparagus stalk first; conveying the longer spears over a transversly disposed sorting plate wherein the center of gravity of the longer spears maintains said spears on said plate while passing thereover; allowing the shorter asparagus tip portions to drop from the sorting plate as a result of the center of gravity of the shorter tip portions being disposed from said plate; conveying the longer spears perpendicular to the direction of the first conveying in segmented channels to a second cutting means while the shorter tips are conveyed to a packaging container; cutting the longer spears into sized spears and center cut portions; packing the sized spears and packaging the remaining center cut portions, the entire operation being performed in the growing field.

* * * * *